United States Patent
Niebling et al.

(10) Patent No.: US 6,790,145 B2
(45) Date of Patent: Sep. 14, 2004

(54) WHEEL BEARING UNIT, COMPRISING ROLLER BEARING AND CONSTANT-VELOCITY JOINT

(75) Inventors: Peter Niebling, Bad Kissingen (DE); Heinrich Hofmann, Schweinfurt (DE); Peter Kleinmann, Schwanfeld (DE); Rainer Breitenbach, Gochsheim (DE)

(73) Assignee: FAG Kugelfischer AG (DE)

( * ) Notice: Subject to any disclaimer, the term of this patent is extended or adjusted under 35 U.S.C. 154(b) by 50 days.

(21) Appl. No.: 10/179,662

(22) Filed: Jun. 24, 2002

(65) Prior Publication Data

US 2002/0198058 A1 Dec. 26, 2002

(30) Foreign Application Priority Data

Jun. 22, 2001 (DE) .......................................... 101 29 709

(51) Int. Cl.⁷ ............................. F16D 3/224; F16C 13/00
(52) U.S. Cl. ....................... 464/178; 464/906; 384/544; 180/259
(58) Field of Search ................................ 464/139, 140, 464/141, 143, 145, 906, 178, 159; 384/544, 506, 504; 301/105.1; 180/259, 258, 385

(56) References Cited

U.S. PATENT DOCUMENTS

| 4,359,128 A | * 11/1982 | Krude .......................... 180/258 |
| 4,405,032 A | * 9/1983 | Welschof et al. ............ 180/259 |
| 4,765,688 A | * 8/1988 | Hofmann et al. ......... 301/124.1 |
| 5,486,053 A | * 1/1996 | Beagley et al. .............. 384/513 |
| 5,725,285 A | * 3/1998 | Niebling et al. .......... 301/105.1 |
| 5,947,826 A | * 9/1999 | Seguin ........................ 464/145 |

* cited by examiner

*Primary Examiner*—David Bagnell
*Assistant Examiner*—Kenn Thompson
(74) *Attorney, Agent, or Firm*—Ostrolenk, Faber, Gerb & Soffen, LLP

(57) ABSTRACT

Wheel bearing unit for motor vehicles, comprising a roller bearing and a constant-velocity joint arranged inside the roller bearing. The outer part of the constant-velocity joint is situated opposite the inner ring flange of the bearing with clearance, and the outer part has an axially aligned extension section, in the area of which torque is transmitted. Only the extension section has radially directed projections, which project into recesses of the inner ring or the inner ring flange.

13 Claims, 8 Drawing Sheets

WHEEL BEARING UNIT, COMPRISING ROLLER BEARING AND CONSTANT-VELOCITY JOINT

FIELD OF THE INVENTION

The invention relates to a wheel bearing and a constant-velocity joint, with the constant-velocity joint being arranged inside the wheel bearing, and particularly relates to the securement of these parts.

BACKGROUND OF THE INVENTION

Integration of parts and, related to this, the requirement for lightweight construction is a long-standing requirement in motor vehicle construction. This also applies to the wheel bearing and to the efforts made to integrate as many wheel bearing peripheral functions as possible into the wheel bearing.

A wheel bearing with an integrated constant-velocity joint is shown in DE 2903229 A1. In this publication, the drive torque is frictionally transmitted to the inner ring flange by an axial extension of the outer part of the constant-velocity joint. The problem with this arrangement is that it does not permit precise, true guiding of the brake disk and the rim with no run-out, since both parts are centered via the axial extension of the outer part.

OBJECT OF THE INVENTION

The object of the invention is to provide a new type of connection between the wheel bearing and the constant-velocity joint, which meets the demands for lightweight construction, is easy to manufacture in terms of production engineering and permits true positioning of the brake disk and the rim with no run-out.

SUMMARY OF THE INVENTION

The essence of the invention is that the outer part of the constant-velocity joint is axially extended and the extended part is received in the inner ring or the inner ring flange. The contours for the projections or teeth directed radially outward are then incorporated in this extension. These projections of the outer part are inserted axially into the depressions in the inner ring flange during and assembly and the projections are positively centered by these depressions. Since the area of the raceways subject to loading by the balls of the constant-velocity joint is situated at an axial distance opposite the stressed region of the inner ring flange, no constraining forces are generated in the outer part of the joint between the raceways of the constant-velocity joint, since the production tolerances in the outer part can be flexibly compensated for in operation. The brake disk and rim are centered by way of the inner ring flange and consequently run largely true with no run-out.

A further advantage of providing the radial projections in the axially extended area of the outer part of the constant-velocity joint is that the drive and output torque is introduced into the inner ring flange at the point where the flange is directed radially outward. This torque is thereby introduced at a point of high rigidity.

As the constant-velocity joint may be designed as a sheet metal part, this has the advantage that the projections directed radially outwardly can also be formed when the part is being formed.

Less than all, and preferably every second raceway constant-velocity joint is formed as an axially extended raceway. This has the advantage that scarcely any additional production engineering costs are incurred in order to form the extension of the raceways. Here, only the raceways that are opened toward the axial extension of the outer part are extended. The raceways that are in the axial extension portion thereby form the projections that are directed radially outward.

The radial projections in the axially extended area may be produced by a stepped tool. These projections lie axially in the extension of the raceways. This has the advantage that in this area the projections can be optimized in respect of their load-bearing flanks. A further advantage is that continuous depressions can be incorporated in the inner ring flange. After fitting the outer part of the constant-velocity joint into the inner ring flange, the area of the radial projections then fits tightly in the inner ring flange. The area of the raceways bearing the load of the balls of the constant-velocity joint has the necessary clearance inside the recess in the inner ring flange.

The radial projections are situated between the outer part of the constant-velocity joint and the inner ring flange in the axial area of the inner ring flange which is directed radially outward in order to accommodate a brake disk and a wheel rim. The advantage of this axial position of the projections is that the drive torque or output torque is introduced into the inner ring flange in an area that does not have high material load stresses. The high material load stresses in the inner ring flange—caused by the forces introduced into the inner ring flange when cornering (reversed bending stresses)—are situated in the area of the transition from the wheel flange to the wheel-side inner ring. By introducing the drive and output torque directly beneath that part of the inner ring flange directed radially outward, the area in the inner ring flange highly subject to reversed bending stresses is not additionally subject to drive or output torques.

The outer part of the constant-velocity joint is fixed in the inner ring flange using a securing element. This has the advantage that the outer part can be fixed and pretensioned by the simplest of means without weakening the inner ring flange through high material load stressing at any point. A further advantage of this securing element is that it is considerably lighter than known fixing mechanisms for constant-velocity joints.

Herein, the inner ring flange may be a separate part which holds the inner ring of the bearing or may be in the inner ring itself.

DESCRIPTION OF PREFERRED EMBODIMENTS

Figure 1:
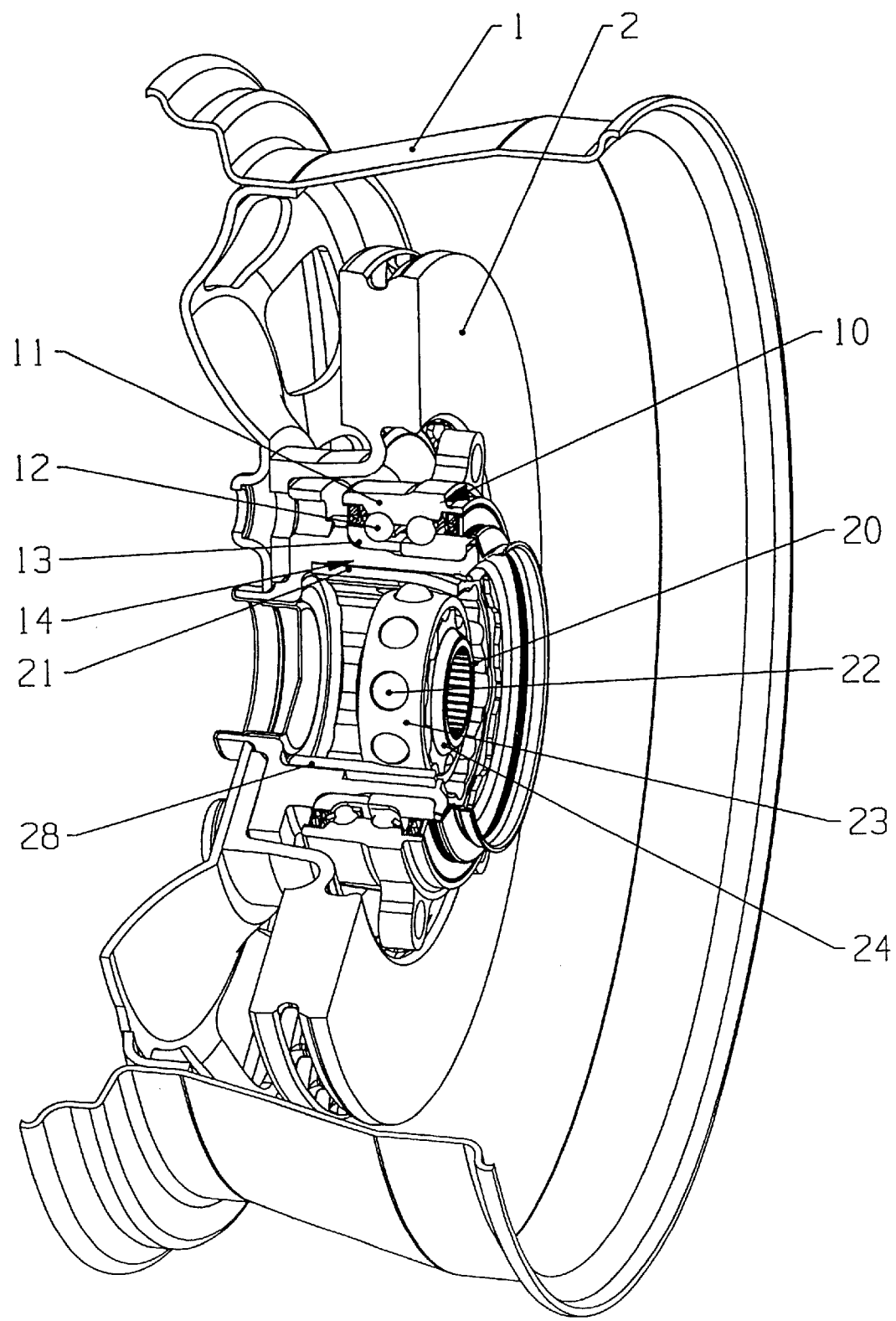
FIG. 1 shows a wheel bearing unit with brake disk and rim.

FIG. 1 shows the complete wheel bearing unit and its surrounding elements. The wheel bearing unit comprises the roller bearing 10 and the constant-velocity joint 20 inside the bearing unit. A brake disk 2 and a wheel rim 1 are fixed to an inner ring flange 14 of the roller bearing 10.

The roller bearing 10 comprises an outer ring 11, two rows of rolling elements 12, here balls, and two inner rings 13 each radially inside a row of the balls. Such a bearing structure is conventional. The entire bearing 10, is arranged radially outside of and is disposed on the inner ring flange 14. Although the flange 14 is illustrated herein as a separate element from the inner rings 13, they may be one element, with those rings 13 being part thereof. There may alternatively be one inner ring for all rolling elements. There may be one row of rolling elements 12.

The constant-velocity joint 20 comprises an outer part 21 at the inner ring flange, a row of bearing element balls 22, a cage or separator 23 for the row of balls and an inner part 24 of the constant-velocity joint. These are inside the inner ring flange 14. The general construction of a constant-velocity joint is conventional.

The invention includes toothing between the inner ring flange 14 and the outer part 21 of the constant-velocity joint and the toothing lies in the area of the axial extension 28 of the outer part 21, axially removed from the row of balls 22 and beyond the rows of balls 12, as well.

Figure 2:
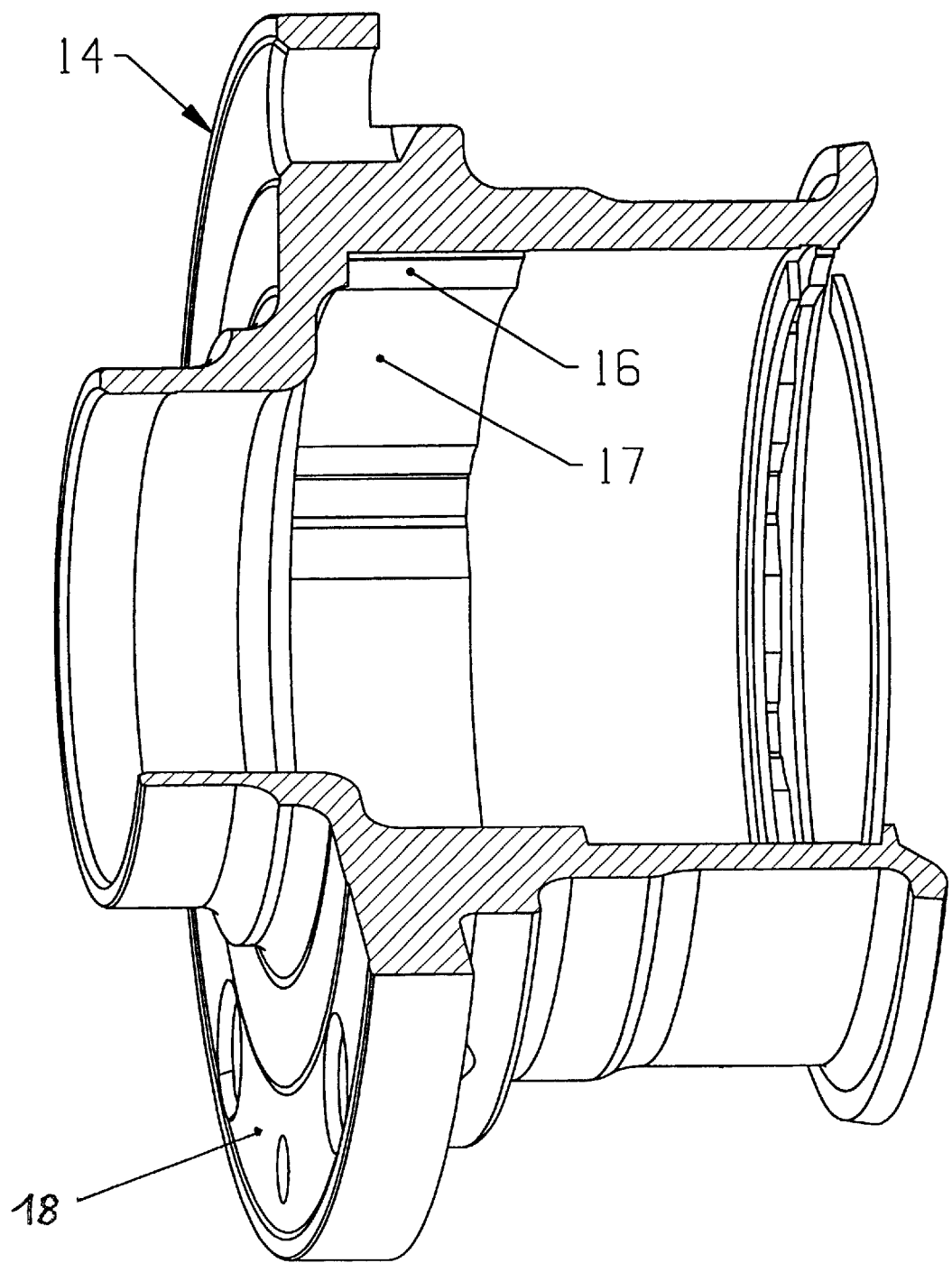
FIG. 2 shows the inner ring flange of the roller bearing with recesses.

FIG. 2 shows the inner ring flange 14. It includes a recess 16 situated in the axial area 17 of the inner ring flange 14. The recess 16 is shaped so that the projections in the axial extension 28 of the constant-velocity joint (not shown in FIG. 2) can engage in the recess. These recesses 16 transmit torque from the outer part 21 of the constant-velocity joint to the inner ring flange 14. In addition, the outer part 21 is guided radially in the recesses 16. It is seen that torque is introduced into the inner ring flange 14 in an axial area 17 where the inner ring flange 14 has a flange 18 thereof which is directed radially outward for accommodating the brake disk 2 and the rim 1. The axial area that is radially beneath the inner rings and that is highly stressed due to the reversed bending stresses of the wheel is therefore not subject to additional load stresses due to introduction of the drive torque.

Figure 3:
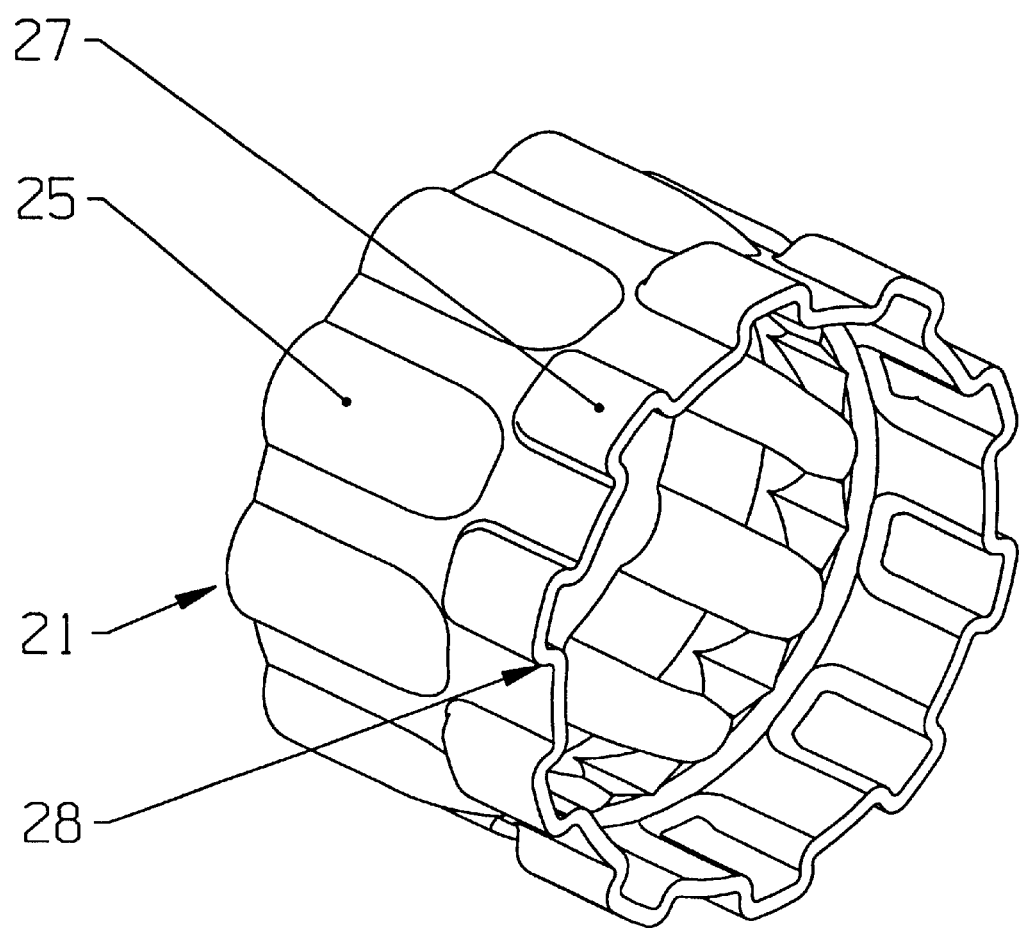
FIG. 3 shows the outer part of the constant-velocity joint with radially directed projections.

FIG. 3 shows the outer part 21 of an embodiment of the constant-velocity joint 20 with a plurality of circumferentially spaced apart, axially extended, radially profiled raceways 25, each for a respective one of the balls 22 of the joint 20. FIG. 3 shows joint 20 from the direction of view opposite to FIG. 1. In this example, the raceways 25 run parallel axially and extend axially in the same direction, that is, the large diameter of all raceways is on that axial side of the outer part 21 situated on the opposite side to the axial extension 28. Radial projections 27 are incorporated in the axial extension 28. The axial extension causes possible production tolerances between the projections 27 and the recesses 16 in the inner ring flange 14 (not shown in FIG. 3) to have scarcely any effect on the raceways 25. The projections 27 center the outer part 21 in the recesses 16 of the inner ring flange 14.

Figure 4:
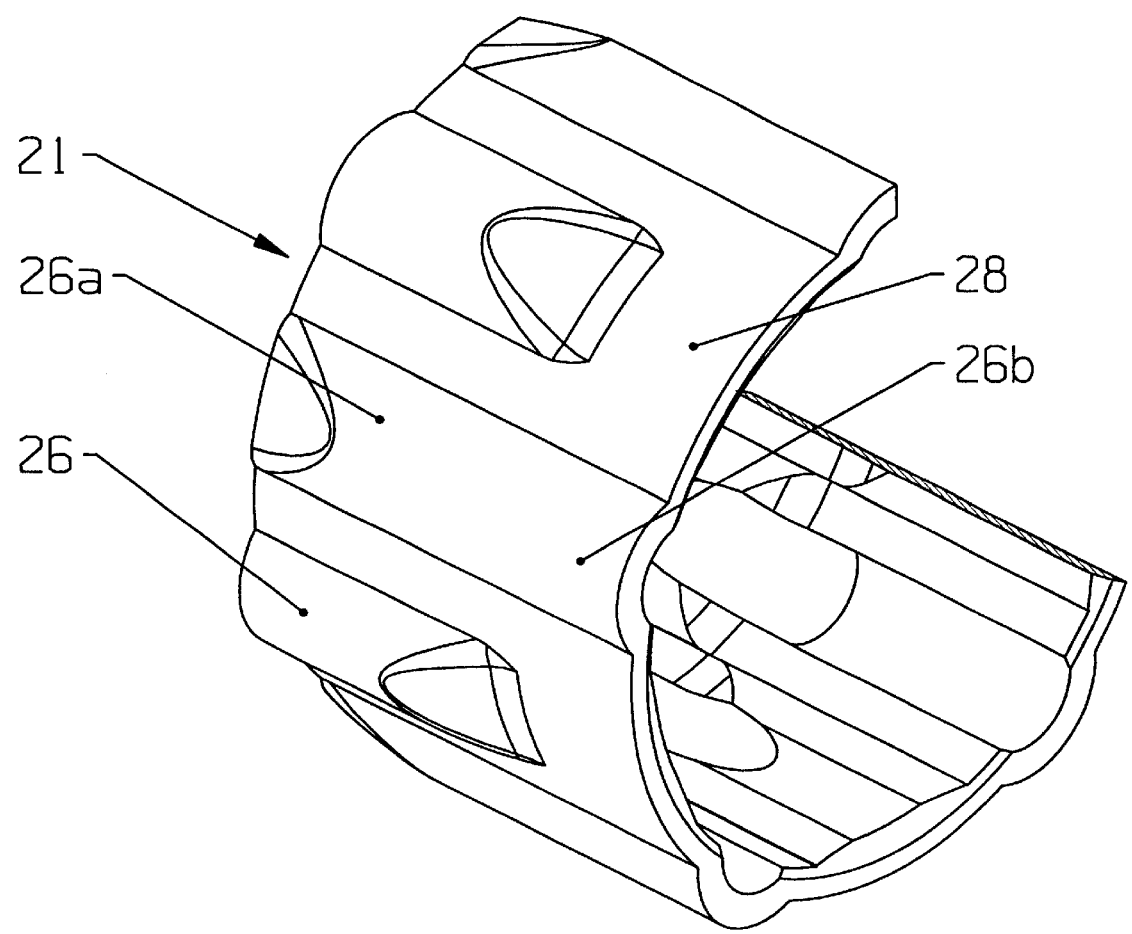
FIG. 4 shows the outer part of the constant-velocity joint with opposed raceways, every second raceway being extended unilaterally.

FIG. 4 shows an alternate outer part 21 of a constant-velocity joint with oppositely directed, axially partially overlapping raceways for the balls 22 (not shown here). In this case, the raceways are alternately directed toward both axial sides. The raceways 26 have their large diameter on that axial side of the outer part without or away from the axial extension. The alternate raceways 26a have their large diameter on the axial side of the axial extension 28. If the outer part is made, preferably, as a formed sheet metal part, the raceways are, among other things, formed laterally in the outer part by two stamping operations. In this, the radial projections 26b are formed by plunging a tool into the side of the axial extension 28, so that the projections 26b correspond to the cross-sectional shape of the raceway 26a at the large diameter. In this process, only every second raceway 26a, with its large diameter on the side of the axial extension 28, is axially extended into extensions 28. In the axial area of the axial extension 28, the balls 22 of the constant-velocity joint 20 do not run up to the extended raceway. The advantage of this embodiment of the projections 26b is that the stamping tool can be easily manufactured. It is possible to incorporate additional projections, directed radially outward, between the projections 26b in the area of the axial extension 28.

Figure 5:
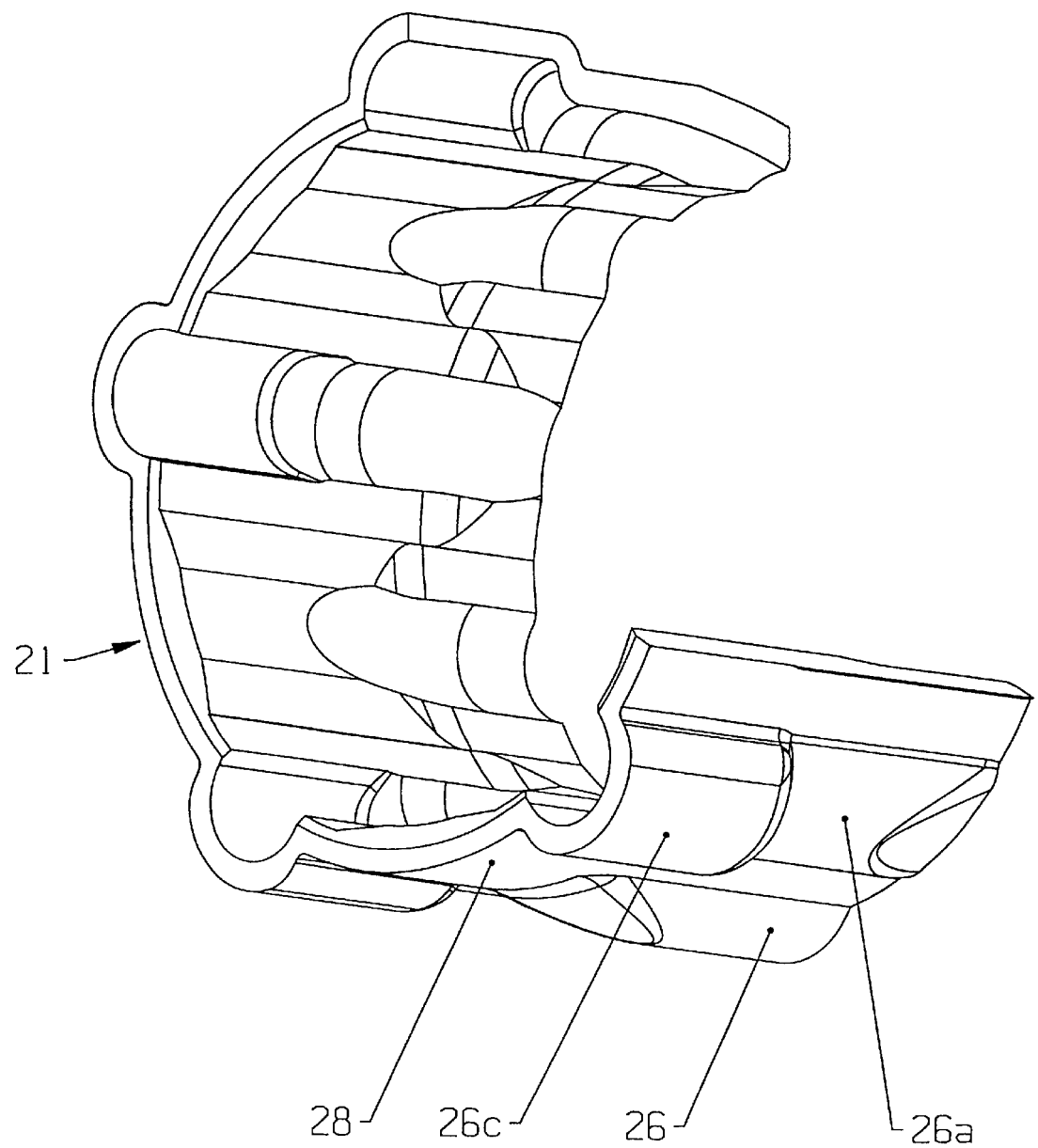
FIG. 5 shows the joint as in FIG. 4, but with the unilateral extension of the raceways being stepped.

FIG. 5 likewise shows an outer part of a joint 21 with axially opposite raceways. The raceway 26a (large diameter toward the axial extension 28) is shown in the extension as including a projection 26c, which is radially larger than the raceway 26a. This variant has the advantage that the projection 26c can be designed so that it will permit efficient transmission of the torque and so that the radial guiding of the outer part 21 in the inner ring flange 14 can be optimized.

Figure 6:
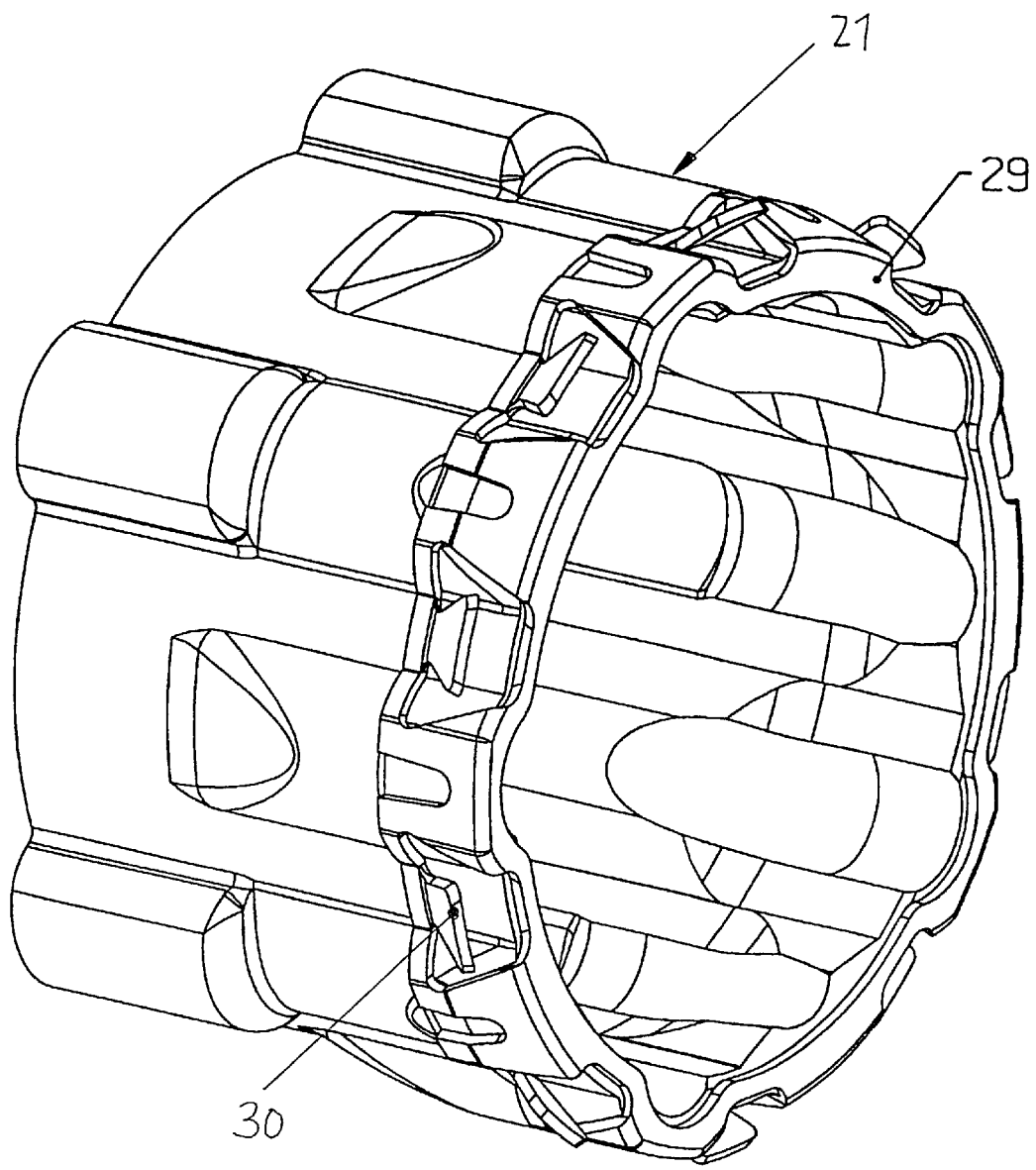
FIG. 6 shows the outer part of the constant-velocity joint with a securing element.
Figure 7:
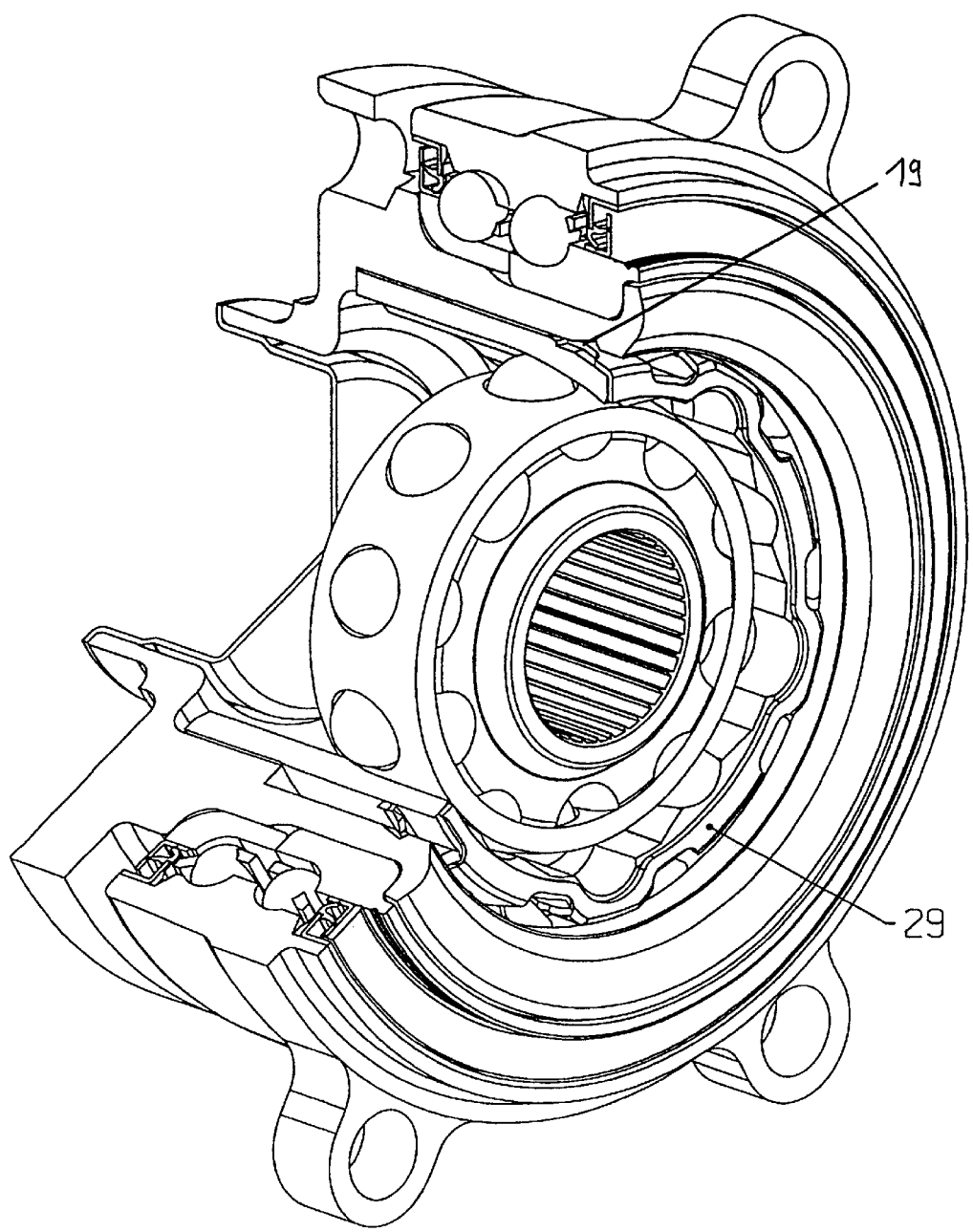
FIG. 7 shows a wheel bearing unit with a securing element.
Figure 8:
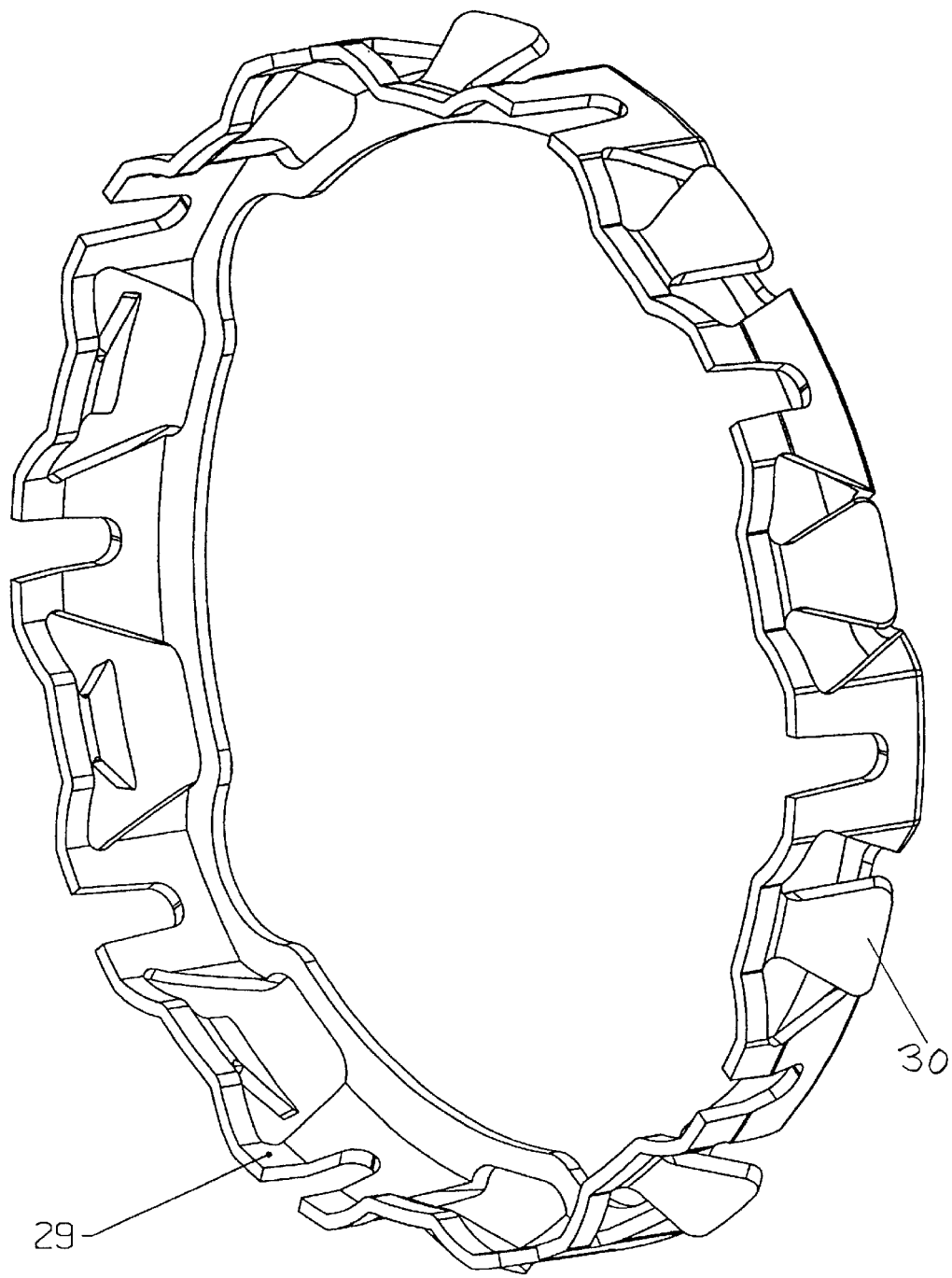
FIG. 8 shows the securing element.

FIG. 6 shows the outer part 21 of the constant-velocity joint 20 with a securing element 29, which is arranged axially on the axially opposite side away from the axial extension 28. FIG. 8 shows the securing element. After fitting the outer part 21 into the inner ring flange 14, elevations 30 of the securing element, which are of flexible design, spring elastically into a depression 19 in the inside of the inner ring flange 14 (FIG. 7). When dismantling the constant-velocity joint 20 (following damage in service, for example), the constant-velocity joint 20 with outer part 21 is pushed out axially, and the elevations 30 are bent over and then broken off.

FIG. 7 represents the wheel bearing unit when installed. The elevations 30 of the securing element 29 then project into the depression 19 in the inner ring flange 14.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing unit for a motor vehicle, the wheel bearing unit comprising an annular roller bearing and a constant-velocity joint arranged inside the roller bearing;

the roller bearing comprising an outer ring, an inner ring and first rolling elements between the outer and inner rings;

an inner ring flange radially inward of the bearing inner ring, the inner ring flange having a wheel rim flange which is directed radially outwardly for accommodating a brake disk, and the entire roller bearing is disposed radially outside of and on the inner ring flange, except that the wheel rim flange extends radially out past the roller bearing; the inner ring flange having a radially inner side with recesses therein;

the constant velocity joint including an outer part, an inner part, a row of second rolling elements between the outer and the inner parts, respective raceways in the outer part receiving the second rolling elements;

the outer part of the constant velocity joint includes an axially extended extension section extending away from the second rolling elements, and radially outwardly directed projections on the axially extended extension section, the projections being shaped for projecting into the recesses of the inner ring flange, the projections of the outer part of the constant velocity joint extending into the axial area of the wheel rim flange of the inner ring flange.

2. The wheel bearing unit of claim 1, wherein the outer part of the constant velocity joint is a formed sheet metal part.

3. The wheel bearing unit of claim 1, wherein the outer part of the constant velocity joint has axially oppositely directed raceways which partially axially overlap for defining the raceways for the row of second rolling elements of the constant velocity joint, and fewer than all of the raceways being axially extended to form the radially directed projections.

4. The wheel bearing unit of claim 3, wherein every second one of the raceways around the constant velocity joint outer part is axially extended to form the radially directed projections.

5. The wheel bearing unit of claim 3, wherein the cross-sectional shape of the axial extension of the outer part of the constant velocity joint is larger radially than the constant velocity joint outer part in the axial area of the raceways for increasing the contact surface between the inner ring flange and the radially directed projections of the outer part.

6. The wheel bearing unit of claim 1, further comprising a securing element securing the outer part of the constant velocity joint in the inner ring flange.

7. The wheel bearing unit of claim 6, wherein the securing element has a generally L-shaped cross-section including elevations forming a leg of the L; and a depression in the inner ring flange for receiving the elevations of the securing element.

8. The wheel bearing unit of claim 7, wherein the elevations are pre-tensioned in the depression for fixing the outer part without axial play.

9. A wheel bearing unit for a motor vehicle, the wheel bearing unit comprising an annular roller bearing and a constant-velocity joint arranged inside the roller bearing;

the roller bearing comprising an outer ring, an inner ring and first rolling elements between the outer and inner rings;

an inner ring flange radially inward of the bearing inner ring, the inner ring flange having a radially inner side with recesses therein;

the constant velocity joint including an outer part, an inner part, a row of second rolling elements between the outer and the inner parts, respective raceways in the outer part receiving the second rolling elements;

the outer part of the constant velocity joint includes an axially extended extension section extending away from the second rolling elements, and radially outwardly directed projections on the axially extended extension section, the projections being shaped for projecting into the recesses of the inner ring flange wherein the outer part of the constant velocity joint has axially oppositely directed raceways which partially axially overlap for defining the raceways for the row of second rolling elements of the constant velocity joint, and fewer than all of the raceways being axially extended to from the radially directed projections.

10. The wheel bearing unit of claim 9, wherein every second one of the raceways around the constant velocity joint outer part is axially extended to form the radially directed projections.

11. The wheel bearing unit of claim 9, wherein the cross-sectional shape of the axial extension of the outer part of the constant velocity joint is larger radially than the constant velocity joint outer part in the axial area of the raceways for increasing the contact surface between the inner ring flange and the radially directed projections of the outer part.

12. A wheel bearing unit for a motor vehicle, the wheel bearing unit comprising an annular roller bearing and a constant-velocity joint arranged inside the roller bearing;

the roller bearing comprising an outer ring, an inner ring and first rolling elements between the outer and inner rings;

an inner ring flange radially inward of the bearing inner ring, the inner ring flange having a radially inner side with recesses therein;

the constant velocity joint including an outer part, an inner part, a row of second rolling elements between the outer and the inner parts, respective raceways in the outer part receiving the second rolling elements;

the outer part of the constant velocity joint includes an axially extended extension section extending away from the second rolling elements, and radially outwardly directed projections on the axially extended extension section, the projections being shaped for projecting into the recesses of the inner ring flange;

a securing element securing the outer part of the constant velocity joint in the inner ring flange; the securing element having a generally L-shaped cross-section including elevations forming a leg of the L; and a depression in the inner ring flange for receiving the elevations of the securing element.

13. The wheel bearing unit of claim 12, wherein the elevations are pre-tensioned in the depression for fixing the outer part without axial play.

* * * * *